US009775336B2

(12) United States Patent
Boericke, II et al.

(10) Patent No.: US 9,775,336 B2
(45) Date of Patent: Oct. 3, 2017

(54) ACOUSTIC PROJECTOR WITH SOURCE LEVEL MONITORING AND CONTROL

(71) Applicant: Airmar Technology Corporation, Milford, NH (US)

(72) Inventors: Frederic S. Boericke, II, Mont Vernon, NH (US); Kenneth D. Rolt, Westford, MA (US); Danny J. Fladung, Springfield, NH (US)

(73) Assignee: AIRMAR TECHNOLOGY CORPORATION, Milford, NH (US)

( * ) Notice: Subject to any disclaimer, the term of this patent is extended or adjusted under 35 U.S.C. 154(b) by 438 days.

(21) Appl. No.: 14/099,281

(22) Filed: Dec. 6, 2013

(65) Prior Publication Data

US 2015/0157007 A1    Jun. 11, 2015

(51) Int. Cl.
| | | |
|---|---|---|
| *A01M 29/16* | (2011.01) | |
| *G01H 11/06* | (2006.01) | |
| *G01S 7/52* | (2006.01) | |
| *G01S 7/524* | (2006.01) | |

(52) U.S. Cl.
CPC ............. *A01M 29/16* (2013.01); *G01H 11/06* (2013.01); *G01S 7/52004* (2013.01); *G01S 7/524* (2013.01); *G01S 2007/52007* (2013.01)

(58) Field of Classification Search
CPC .. G01S 7/52; G01S 7/524; G01S 2007/52007; G01V 1/38; A01M 29/16; G01H 11/06
See application file for complete search history.

(56) References Cited

U.S. PATENT DOCUMENTS

| | | |
|---|---|---|
| 1,610,674 A | 12/1926 | Hahnemann et al. |
| 2,064,911 A | 12/1936 | Hayes |
| 2,451,509 A | 10/1948 | Owsley |
| 3,264,772 A | 8/1966 | Hart |
| 3,307,285 A | 3/1967 | Wells |
| 3,317,889 A | 5/1967 | Barrand |
| 3,414,873 A | 12/1968 | Richard et al. |
| 3,524,276 A | 8/1970 | Thomas et al. |
| 3,872,472 A | 3/1975 | Moschgat |
| 4,453,238 A | 6/1984 | Van Buren |
| 4,556,010 A | 12/1985 | Persson et al. |
| 4,580,525 A | 4/1986 | Marzluf |

(Continued)

FOREIGN PATENT DOCUMENTS

| | | |
|---|---|---|
| WO | WO 90/01758 | 2/1990 |
| WO | WO 2015/085072 | 6/2015 |

OTHER PUBLICATIONS

Armson, M., "Good News for Sensor Users: IEEE P1451.4 Meets Plug and Play," 1-7, (Oct. 2002).
Johnson, R., "Defining the Core Features of Smart Sensors to Facilitate Broader Adoption," *Smart Transducer Interface Standard-IEEE* 1451, Sensors Expo, Chicago, 1-17, (Jun. 3, 2003).
Johnson, R., "Proposed IEEE Standard P1451.0, Defining the Core Features of Smart Sensors to Facilitate Broader Adoption,", 1-9, (Jun. 2003).
Lee, K., "A Synopsis of the IEEE P1451-Standards for Smart Transducer Communication," *National Institute of Standards and Technology*, 1-6, 1999.
Lee, K., "IEEE 1451: A Standard in Support of Smart Transducer Networking," *IEEE Instrumentation and Measurement Technology Conference*, 1-4, (May 1-4, 2000).

(Continued)

*Primary Examiner* — Hovhannes Baghdasaryan
(74) *Attorney, Agent, or Firm* — Hamilton, Brook, Smith & Reynolds, P.C.

(57) ABSTRACT

In an embodiment, an acoustic projector includes an acoustic transmit transducer capable of producing a sound pressure radiation in response to a driver signal received from a transmit source, an acoustic receive transducer capable of producing a source level signal in response to receiving at least a portion of the sound pressure radiation, and a controller configured to monitor the source level signal and report the source level signal monitored.

28 Claims, 5 Drawing Sheets

(56) References Cited

U.S. PATENT DOCUMENTS

| | | | |
|---|---|---|---|
| 4,593,648 A | 6/1986 | Marzluf | |
| 4,642,801 A | 2/1987 | Perny | |
| 4,646,276 A | 2/1987 | Kowalewski et al. | |
| 4,750,451 A | 6/1988 | Smith | |
| 4,825,810 A | 5/1989 | Sharber | |
| 4,918,668 A * | 4/1990 | Sallas | G01V 1/006 367/138 |
| 4,922,468 A | 5/1990 | Menezes | |
| 4,932,007 A | 6/1990 | Suomala | |
| 4,933,918 A | 6/1990 | Landsrath et al. | |
| 4,955,005 A | 9/1990 | Loeffelman | |
| 5,117,572 A | 6/1992 | Parra | |
| 5,134,592 A | 7/1992 | Parra | |
| 5,214,619 A | 5/1993 | Yoshida | |
| 5,390,152 A | 2/1995 | Boucher et al. | |
| 5,610,876 A | 3/1997 | Jeffers | |
| 5,978,316 A * | 11/1999 | Ambs | H04B 11/00 181/120 |
| 6,243,654 B1 | 6/2001 | Johnson et al. | |
| 6,388,949 B1 * | 5/2002 | Lenhardt | A01K 79/02 116/22 A |
| 7,229,411 B2 | 6/2007 | Slayton et al. | |
| 7,369,458 B2 | 5/2008 | Sifferman et al. | |
| 7,521,023 B2 | 4/2009 | Laugharn, Jr. et al. | |
| 7,974,152 B2 * | 7/2011 | Tenghamn | G01V 1/159 181/110 |
| 8,582,393 B2 | 11/2013 | Boericke, II et al. | |
| 2003/0040882 A1 * | 2/2003 | Sheard | G01V 3/06 702/127 |
| 2003/0088372 A1 * | 5/2003 | Caulfield | G01V 13/00 702/40 |
| 2004/0004907 A1 * | 1/2004 | Austad | G01V 1/3835 367/154 |
| 2005/0093706 A1 * | 5/2005 | Hoenig | G08B 29/185 340/573.6 |
| 2005/0232638 A1 * | 10/2005 | Fucile | H04B 13/02 398/140 |
| 2007/0274531 A1 | 11/2007 | Camp | |
| 2009/0171342 A1 | 7/2009 | Klimovitch et al. | |
| 2010/0046772 A1 * | 2/2010 | Veau | H04R 3/007 381/103 |
| 2010/0272270 A1 | 10/2010 | Chaikin et al. | |
| 2010/0322028 A1 * | 12/2010 | Tenghamn | G10K 9/121 367/21 |
| 2011/0056267 A1 * | 3/2011 | Qin | B06B 1/0223 73/1.82 |
| 2011/0228634 A1 * | 9/2011 | Boericke, II | G01S 7/52006 367/13 |

OTHER PUBLICATIONS

Lee, K., "Smart Sensor Interface Standards," *Sensors Conference/Expo 2002, National Institute of Standards and Technology United States Department of Commerce*, (May 20, 2002).

Mark, J., and Hufnagel, P., "The IEEE 1451.4 Standard for Smart Transducers," 1-13, (Jun. 9, 2004).

Schiefer, M., and Lally, M., "A Framework for Smart Transducer Interface Systems," 1999.

PCT/US2014/068575 Notification of Transmittal of the International Search Report and the Written Opinion of the International Searching Authority, or the Declaration dated Mar. 19, 2015 entitled Acoustic Projector With Source Level Monitoring and Control.

International Preliminary Report on Patentability, for International Application No. PC/US2014/068575, dated Jun. 7, 2016, entitled Acoustic Projector With Source Level Monitoring and Control.

Rolt, K. D., "History of the flextensional electroacoustic transducer," *Journal Acoust. Soc. Am.*, vol. 87; No. 9; 1340-1349 (1990).

Russell, R., "Equalizers," Retrieved from the Internet URL: http://roger-russell.com/equalizers/equalizers.htm [retrieved Mar. 28, 2017].

Valk, R., "Control of Voicecoil transducers: Design and implementation of a Motional Feedback Loudspeaker Woofer," *Department of Precision and Microsystems Engineerings: Control of Voicecoil transducers*, M.S. Thesis, Delft University of Technology (2013).

Weinberg, H., "Accelerometers—Fantasy & Reality", Retrieved from the Internet URL: http://www.analog.com/en/analog-dialogue/articles/accelerometers-fantasy-and-reality.html [retrieved Mar. 28, 2017].

Wikipedia: The Free Encyclopedia [online]. Definition of Tonpilz; Retrieved from the Internet URL: https://en.wikipedia.org/wiki/Tonpilz [retrieved Mar. 20, 2017].

Wikipedia: The Free Encyclopedia [online]. Definition of Near and far field; Retrieved from the Internet URL: https://en.wikipedia.org/wiki/Near_and_far_field [retrieved Mar. 21, 2017].

Wikipedia: The Free Encyclopedia [online]. Definition of Fresnel diffraction; Retrieved from the Internet URL: https://en.wikipedia.org/wiki/Fresnel_diffraction [retrieved Mar. 21, 2017].

Wikipedia: The Free Encyclopedia [online]. Definition of Fraunhofer diffraction; Retrieved from the Internet URL: https://en.wikipedia.org/wiki/Fraunhofer_diffraction [retrieved Mar. 21, 2017].

* cited by examiner

ACOUSTIC PROJECTOR WITH SOURCE LEVEL MONITORING AND CONTROL

BACKGROUND

At commercial and sport fish farms, interference from marine mammals such as seals and sea lions is a serious problem. The mammals prey on the fish kept in submerged fish pens, resulting in loss to the fish farms. Therefore, it is important to the fish farms to keep the mammals away from their fish pens.

Most marine mammals have excellent hearing and the water in which they live is an efficient medium for transmitting sound. The transmission of underwater sounds as warnings or irritants has been used as a method of repelling marine mammals. A typical acoustic deterrent system for repelling marine mammals from a region of water has circuitry including transmission and control circuitry which drives one or more acoustic projectors located beneath the surface of the region of water. The acoustic projector includes a transmit transducer that delivers periodic bursts of high-frequency pulsed acoustic signals, e.g., between about 7 and 10 kHz, into the water under the fish pens, causing the marine mammals to swim away from the pens.

Sonar devices have widespread use in sport fishing, navigation, scuba diving, as well as any number of other recreational or commercial activities. A sonar system typically includes a sonar unit and an acoustic projector that includes a transmit/receive transducer. The sonar unit includes a display for providing information to the operator. The acoustic projector is mounted under the waterline and is responsible for generating a sound pulse and receiving echoes from objects in the water, from the bottom surface, or both. A typical application of the sonar system is for use as a fish finder.

The sonar unit includes circuitry that produces the sound pulse consisting of several cycles of a sonic signal at a fairly high output power. This pulse is delivered to the transmit/receive transducer via a shielded twisted pair cable. After transmission of the pulse in a transmit mode, the transmit/receive transducer is used to "listen" for echoes in a receive mode. Received echoes produce very small signals, on the order of a few millivolts, which are sent to a receiver circuitry in the sonar unit. In the sonar unit, the received echoes are amplified, filtered, and analyzed.

SUMMARY

There is a need for real-time in situ monitoring of the actual acoustic output of the acoustic projectors in acoustic deterrent systems and sonar systems. The present invention relates to acoustic source level monitoring and control of the sound projector using a separate receive transducer such as a hydrophone.

In one aspect, an acoustic projector includes an acoustic transmit transducer capable of producing a sound pressure radiation in response to a driver signal received from a transmit source, an acoustic receive transducer capable of producing a source level signal in response to receiving at least a portion of the sound pressure radiation, and a controller configured to monitor the source level signal and report the source level signal monitored. The controller may be configured to report the source level signal monitored to a remote controller configured to control the drive signal based on the source level signal.

The acoustic projector may include a voltage monitoring circuit configured to measure a voltage level of the driver signal, with the controller configured to monitor the measured voltage level and report the monitored voltage level. The controller may be configured to report the monitored voltage level to a remote controller configured to control the drive signal based on the voltage level signal.

The acoustic projector may include a current monitoring circuit configured to measure a current level of the driver signal, with the controller configured to monitor the measured current level and report the monitored current level. The controller may be configured to report the monitored current level to a remote controller configured to control the drive signal based on the current level signal.

The acoustic projector may include a voltage monitoring circuit configured to measure a voltage level of the driver signal and a current monitoring circuit configured to measure a current level of the driver signal, with the controller configured to monitor the measured voltage level and the measured current level and to derive an indication of impedance of the acoustic transmit transducer based on the monitored voltage level and the monitored current level. The controller may be configured to report the indication of impedance to a remote controller configured to control the drive signal based on the impedance indication.

The acoustic receive transducer may comprise a hydrophone. In some embodiments, the hydrophone comprises a polymer film such as piezoelectric polyvinylidene Flouride (PVDF). In other embodiments, the hydrophone comprises a piezoelectric ceramic.

In another aspect, a method includes producing a sound pressure radiation at an acoustic transmit transducer in response to a drive signal received from a transmit source, producing a source level signal at an acoustic receive transducer in response to receiving at least a portion of the sound pressure radiation, and monitoring the source level signal and reporting the source level signal monitored.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
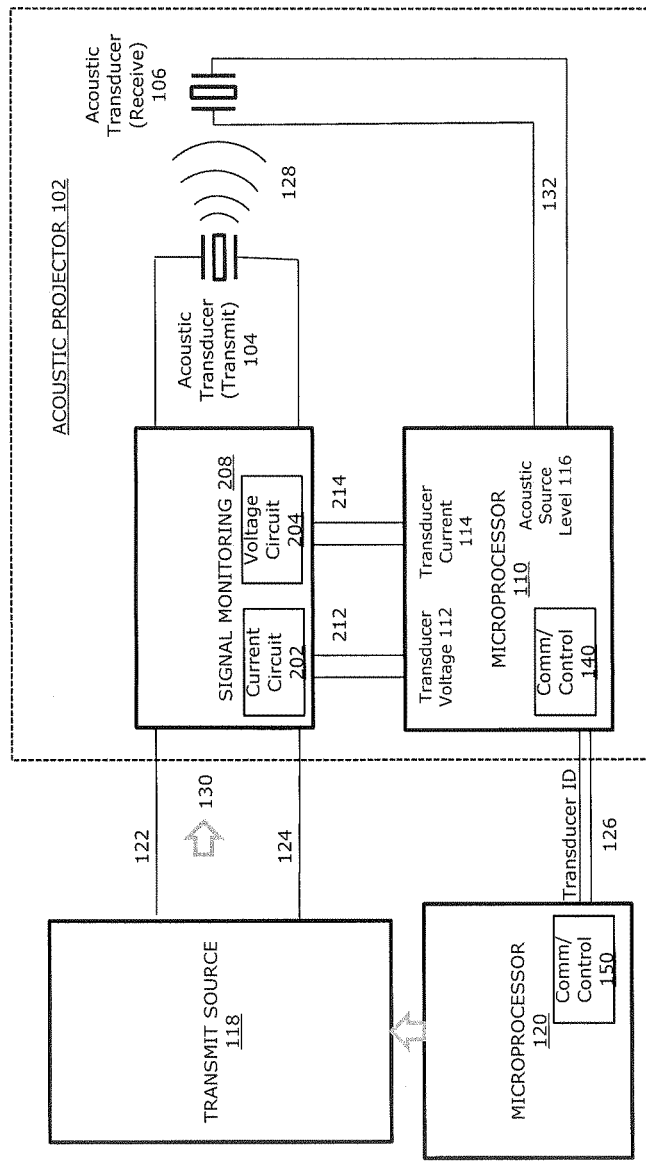
FIG. 1 illustrates a block diagram of an example embodiment.

FIG. 1 illustrates a block diagram of an example embodiment of a sounder system that includes an acoustic projector 102 connected to a transmit source 118 and a microprocessor 120. The connection between the acoustic projector 102 and the transmit source 118 is via a twisted pair cable 122, 124. The connection between the acoustic projector 102 and the microprocessor 120 is via a communication bus 126.

The acoustic projector 102 includes an acoustic transmit transducer 104, an acoustic receive transducer 106, signal monitoring circuitry 208, and a microprocessor 110. The acoustic transmit transducer 104 may contain one or more piezoelectric elements having varying characteristics. The acoustic transmit transducer 104 is configured to produce a sound pressure radiation 128 in response to a drive signal 130 received from the transmit source 118. The drive signal 130 may be any drive signal selected to have appropriate characteristics, including using the appropriate frequencies, at a suitable voltage level, and for an appropriate pulse duration and pulse repetition rate, to cause the acoustic transmit transducer 104 to radiate sound.

The microprocessor 110 is configured to provide source level monitoring of the output of acoustic transmit transducer 104 including monitoring acoustic source level received by acoustic receive transducer 106, monitoring transmit voltage into acoustic transmit transducer 104, monitoring transmit current into acoustic transmit transducer 104, and determining instantaneous impedance from voltage and current readings.

Measuring the acoustic source level and the transmit voltage can be used to assure proper operation of the acoustic transmit transducer 104. Changes in signal waveform from such measurements can indicate problems, such as damage to the transmit transducer (e.g., cracking of the piezoelectric element).

Measuring the transmit current can provide an indication of the instantaneous transducer impedance, which impedance can change with overdriving or excess temperature. Overdrive may include excess voltage, excess current, excess power, excess pulse duration, excess duty cycle, or combination thereof.

When transmitting through a fiberglass or metal hull, e.g., in a fish finder application, the impedance measurements over frequency can indicate the frequency band where the maximum energy is transferred to the water. This can be different for different hull designs and installations, based on the hull thickness and acoustic properties.

The acoustic receive transducer 106 is configured to produce a source level signal in response to receiving at least a portion of the sound pressure radiation 128. The source level signal output 132 from the acoustic receive transducer 106 is provided to acoustic source level 116 input of microprocessor 110. A buffer amplifier (not shown) may be used to boost the signal 132 from the acoustic receive transducer 106.

The signal monitoring circuitry 208 includes current circuit 202 and voltage circuit 204 which provide respective outputs to the monitored transducer voltage 112 and transducer current 114 inputs of microprocessor 110. The transducer voltage 112, transducer current 114, and acoustic source level 116 inputs to the microprocessor 110 are coupled internally to respective analog-to-digital converters in the microprocessor 110.

As described above, the embodiment shown in FIG. 1 includes a transmit source 118 that sends a drive signal to an acoustic transmit transducer 104, which may be used in an embodiment of a sonar system such as used for an echosounder or a fish finder. Those skilled in the art will understand that the transducer in the echosounder or fish finder also functions in a receive mode to "listen" to the echoes, which is a separate and distinct function from the monitoring provided by the acoustic receive transducer 106.

Embodiments of the acoustic transducer 102 may employ Transducer ID system technology (XducerID®, available from Airmar Technology Corp. Milford, N.H.).

The microprocessor 110 includes a communications and control module 140 for communications and control interactions with a corresponding communications and control module 150 at microprocessor 120. The communications includes the interactions with respect to communicating monitoring information as described herein. With respect to control, microprocessor 110 may be controlled by microprocessor 120 (master, slave). In other embodiments, there may be only one microprocessor.

In one example of control of the system based on monitored information, the monitored information may indicate that the acoustic projector is radiating too much acoustic power, which may result in the source sending a drive signal 130 having a lower voltage. Subsequent monitoring information then will show a decrease in the measured current and the measured hydrophone voltage. Similarly, if the derived impedance is unusually too low or too high from a prior established value, this indication may result in either microprocessor 110, 120 making a determination that there is a defect somewhere in the system and shutting down the power delivered to the system.

The microprocessor 110 may further include a non-volatile memory device (not shown) that contains the characteristic information of the transducer. The microprocessor 110, upon system initialization or power-up, may communicate the characteristic information of the transducer from the memory device to the corresponding microprocessor 120 via the communication bus 126.

The communication bus 126 may be a single conductor (wire) plus a ground return in the transducer cable, a multi wire bus, or a fiber optic cable. The transmit source 118 may provide power to the circuitry in the acoustic projector 102. In certain embodiments, the communication bus 126 may provide power to the memory device and the microprocessor 110 in addition to providing bidirectional serial communication (e.g., half duplex) between the microprocessors 110, 120. In certain embodiments, the microprocessors 110, 120 may communicate via an optional wireless communications link (not shown). Generally, any form of communications available in the art may be used to communicate between the microprocessors.

The acoustic receive transducer 106 comprises a hydrophone. The hydrophone may be made from a polymer film such as piezoelectric polyvinylidene Fluoride (PVDF). In other embodiments, the hydrophone comprises a piezoelectric ceramic such as lead zirconate titanate.

In some embodiments, the acoustic receive transducer 106 may be positioned in the nearfield of the acoustic transmit transducer 104, e.g., self-contained within a waterproof (e.g., rubber) housing that contains the acoustic projector. In other embodiments, the acoustic receive transducer 106 may be housed separately and attached to a small jumper cable to allow the acoustic receive transducer 106 to be several feet away and thereby in the farfield. Such an assembly of cable and receive transducer may be made to be heavier-than-water which would allow it to sink beneath the transmit transducer position. In another embodiment, the assembly may be made to be lighter-than-water which would allow it to float above the transmit transducer.

Figure 2:
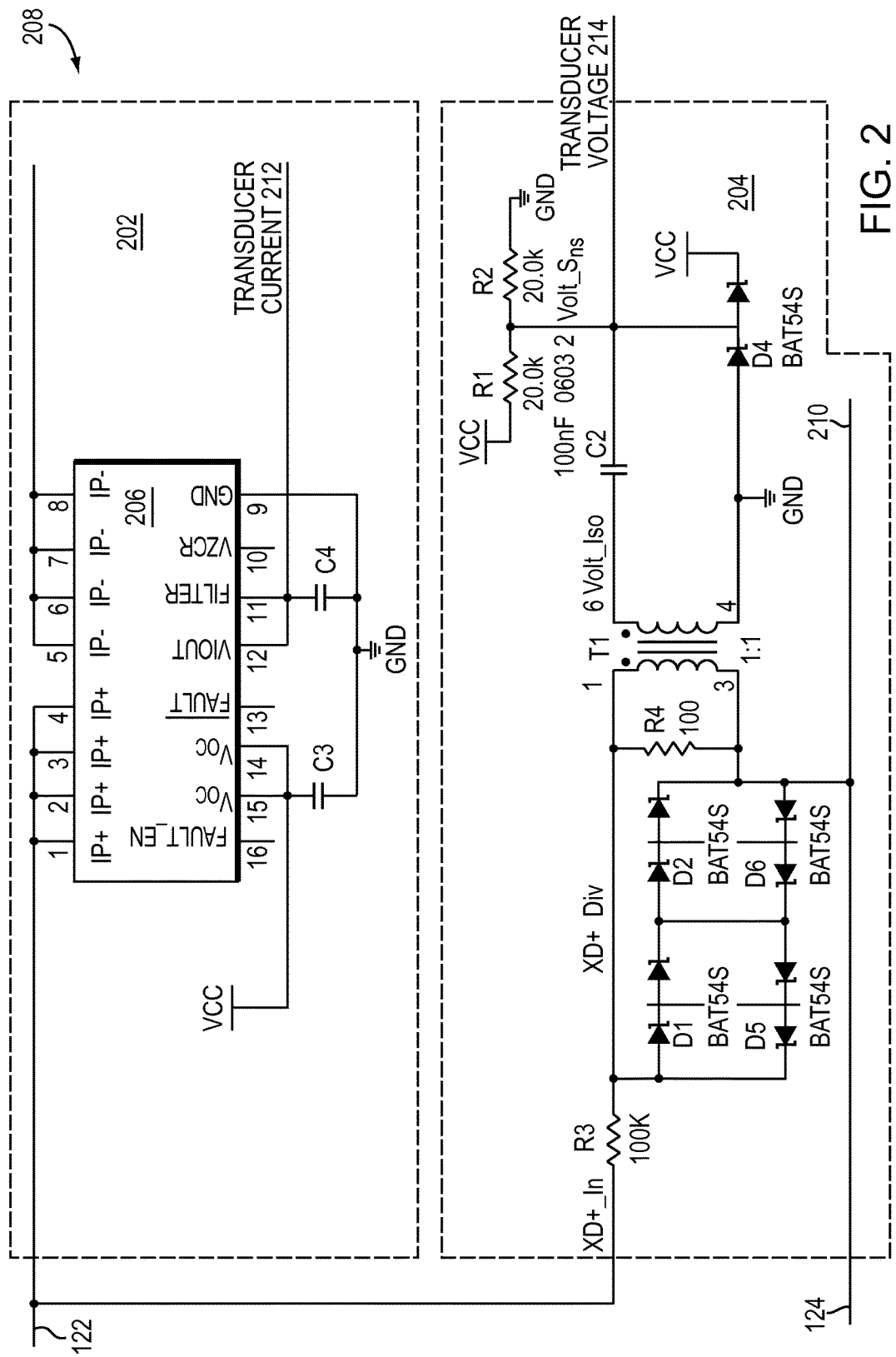
FIG. 2 illustrates a circuit block diagram of an example embodiment of signal monitoring circuitry.

FIG. 2 illustrates a circuit block diagram of an example embodiment of the signal monitoring circuitry 208. The transducer current circuit 202 includes a current sensor chip (e.g., ACS716 available from Allegro MicroSystems, Inc.) that is connected so that the current from transmit source 118 (FIG. 1) on line 122 passes through the chip in proximity to a Hall cell, which measures the magnetic field generated by the current passing through the wire. This is then converted to an output voltage (pin 12) representing the value of instantaneous current with a scale factor of 100 mV/A (for this particular chip). At zero current, the output voltage is Vcc/2 (where Vcc is the power supply to the chip, which is 3.3V in this case). Positive and negative current is indicated by deviations above and below Vcc/2. The output voltage 212 is connected to the ADC input 112 of microprocessor 110 (FIG. 1).

The voltage circuit 204 provides an indication of voltage measured by dividing down by a factor of 1000 (Vout=Vin*(R4/(R3+R4))) the transmit voltage across cable 122, 124. An isolation transformer T1 converts the balanced signal to an unbalanced signal referenced to ground. Capacitor C2 provides AC coupling to the A/D input, while resistors R1 and R2 provide a DC offset of Vcc/2 so that positive and negative voltages can be input to the ADC input 114 of microprocessor 110 (FIG. 1). D4 provides clamping to protect the A/D input in case the signal gets too large. Diodes D1, D2, D5, D6 clamp the input voltage, e.g., to +/− (4*0.4V) or 3.2Vp−p.

The microprocessor 110 may be configured to perform the several monitoring functions described herein. For hydrophone measurements, the output signal 132 is connected to ADC input 116 of the microprocessor 110. When commanded, e.g., by an XID command sent from microprocessor 120, the microprocessor 110 waits for a specified delay, starts the ADC conversion, and reads a specified number of samples at a specified sampling rate. To process the samples, the microprocessor 110 may be configured to find minimum and maximum values in the captured hydrophone waveform data, and convert those min/max values to a Peak to Peak Voltage. The microprocessor 110 may be further configured to find a captured transmit pulse (ping) in the hydrophone waveform data, and calculate an RMS value of the transmit pulse.

For impedance measurements, the output signals 212, 214 from respective current and voltage circuits 202, 204 are connected to corresponding ADC inputs 112, 114 of the microprocessor 110. When commanded e.g., by an XID command sent from microprocessor 120, the microprocessor 110 waits for a specified delay, simultaneously starts the voltage and current ADC conversions, and reads a specified number of samples at a specified sampling rate. To process the samples, the microprocessor 110 may be configured to find the corresponding captured transmit pulse (ping) in the Voltage/Current waveform data. The microprocessor 110 may be further configured to calculate parameters that may include Impedance Imaginary Part in Ohms, Impedance Real Part in Ohms (0-250), Current in 10ths of Amps (0-25.0), Voltage in tens of Volts (0-2500).

For the Voltage, Current, and Source Level measurements, the microprocessor 110 may be configured to capture the waveform, and send the digitally sampled waveform to the transmit source over the bus, in addition to calculating and sending the calculated status information.

Corresponding XID commands may include:

SLM_SETUP_CAPTURE—Setup capture parameters (Delay, Samples, and Sample Rate).

SLM_SETUP_QUERY—Query capture parameters.

SLM_CAPTURE_IMPEDANCE—Start simultaneous capture of Voltage and Current data after delay specified in capture parameters. Sample rate and number of samples to capture are also specified in capture parameters.

SLM_CAPTURE_HYDROPHONE—Start capture of hydrophone data after delay specified in capture parameters. Sample rate and number of samples to capture are also specified in capture parameters.

SLM_STATUS_IMPEDANCE—report impedance, current, and voltage values calculated from captured Voltage and Current data.

SLM_STATUS_HYDROPHONE—report Hydrophone RMS and Peak to Peak values calculated from captured hydrophone data.

SLM_XMIT_VOLTAGE_WF—transmit requested blocks of the Voltage Waveform from the capture impedance command.

SLM_XMIT_CURRENT_WF—transmit requested blocks of the Current Waveform from the capture impedance command.

SLM_XMIT_HYDROPHONE_WF—transmit requested blocks of the Hydrophone Waveform from the capture hydrophone command.

Figure 3:
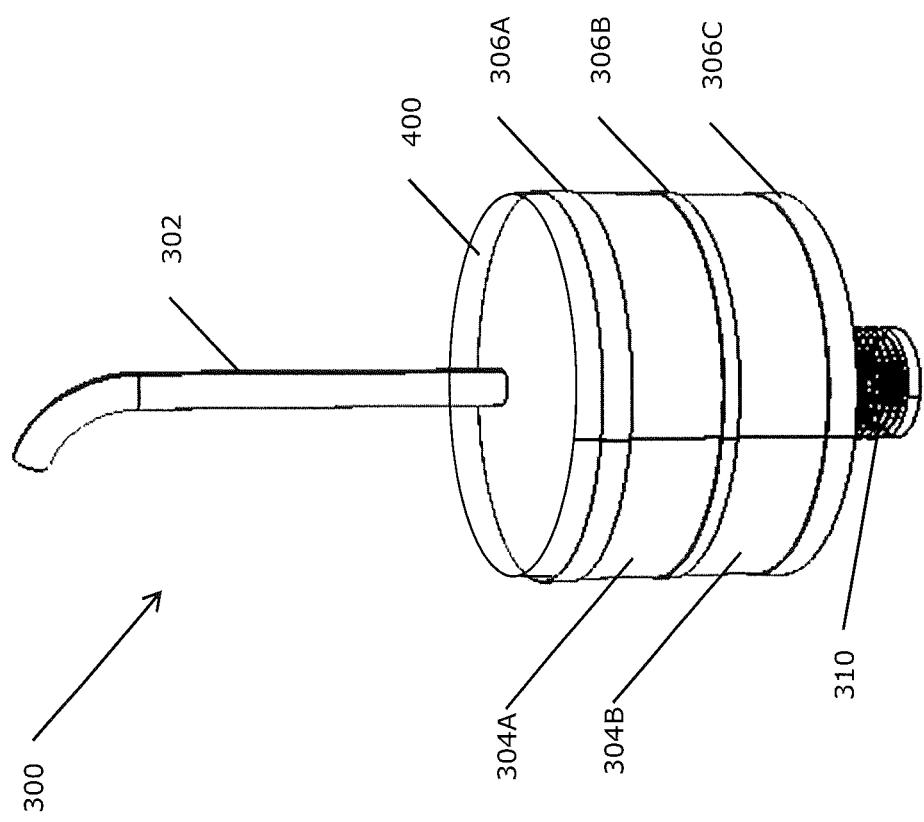
FIG. 3 illustrates a schematic perspective of an example acoustic projector.

FIG. 3 illustrates a schematic perspective of an example acoustic projector 300 in accordance with the principles of the present invention. The projector 300 may be enclosed within an outer shell not shown. A transducer assembly includes annular ring-shaped piezoelectric elements 304A, 304B (corresponding to the acoustic transmit transducer 104 shown in FIG. 1) sandwiched between two layers of epoxy or urethane foam 306A, 306C. A third layer of epoxy or foam 306B separates the pair of piezoelectric elements 304A, 304B. An electric cable 302 connects at the top to deliver the drive signal to the piezoelectric elements 304A, 304B.

A threaded collar 310 is exposed to the exterior to allow stabilizing weights or cables to be threaded into the bottom of the projector 300 to steady it in the water. The ring shape of the piezoelectric elements 304A, 304B produces a toroidal signal in all directions emanating from the projector 300. It should be noted that other shapes for the piezoelectric elements can be used.

Figure 4A:
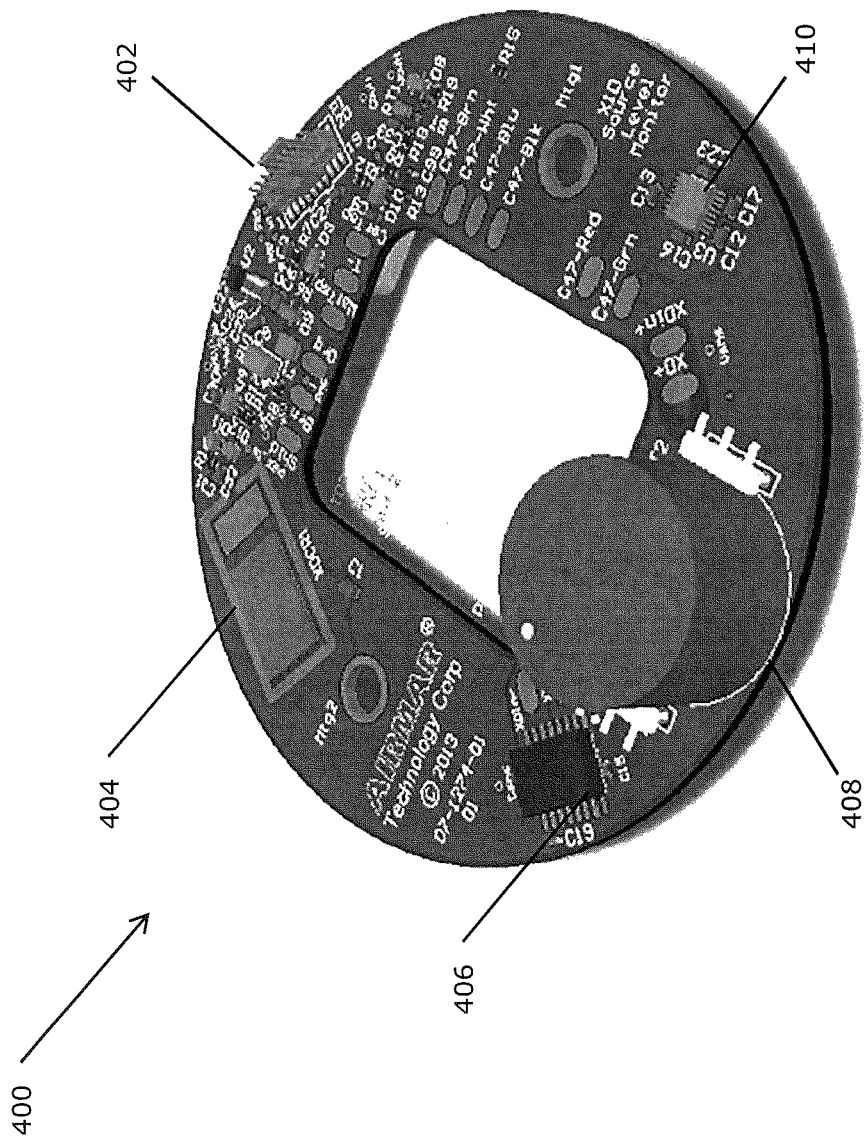
FIGS. 4A and 4B illustrate an example circuit board of FIG. 3.
Figure 4B:
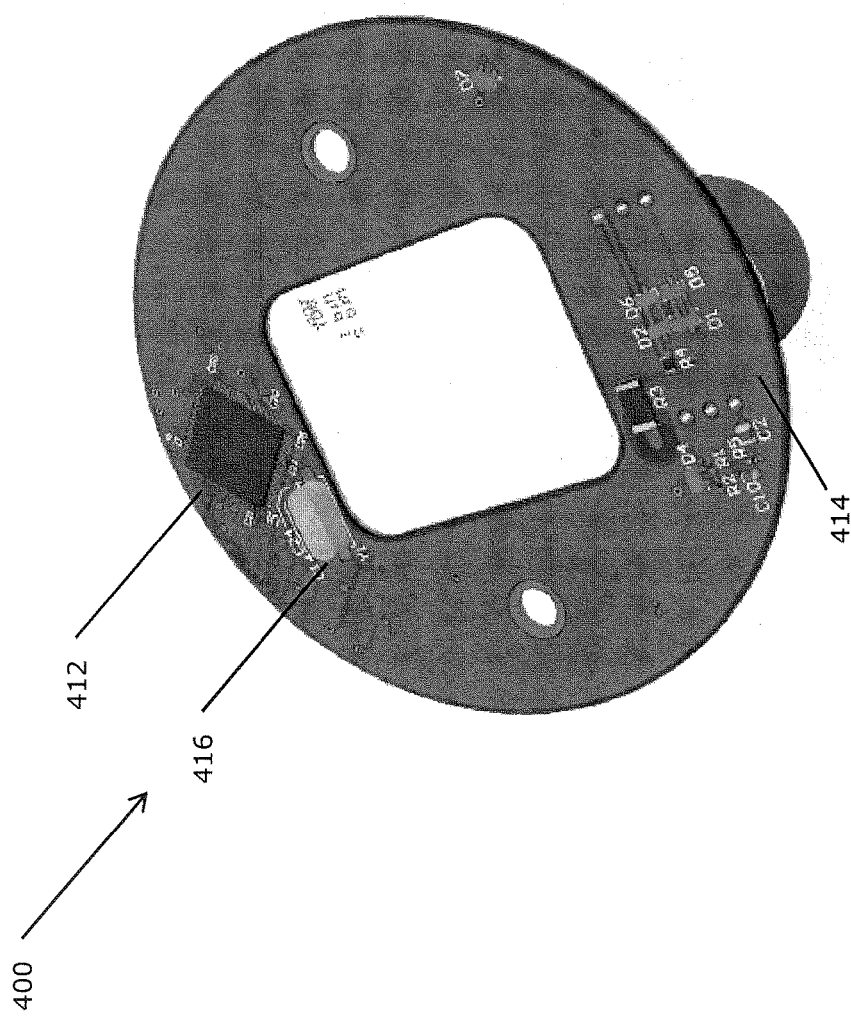

The projector 300 includes a circuit board 400 positioned on top of the transducer assembly. In one embodiment, shown in FIG. 4A, an example circuit board 400 includes a JTAG connector 402 for microprocessor debugging, a PVDF acoustic receive transducer 404, current monitor circuit 406, isolation transformer 408 for voltage measurement circuit, and RS232 transceiver 410 for bootloading microprocessor. Microprocessor 412, voltage and current monitoring circuitry 414, and crystal oscillator 416 are shown in FIG. 4B on the opposite side of the circuit board 400.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. An acoustic projector comprising:
    a marine acoustic transmit transducer capable of producing a sound pressure radiation in response to a driver signal received from a transmit source;
    a marine acoustic receive transducer capable of producing a source level signal in response to receiving at least a portion of the sound pressure radiation;
    a voltage monitoring circuit configured to measure a voltage level of the driver signal;
    a current monitoring circuit configured to measure a current level of the driver signal; and a controller configured to monitor the source level signal and to control the driver signal, based on the source level signal, to control an acoustic power of the sound pressure radiation, the controller further configured to monitor the measured voltage level and the measured current level to derive an indication of impedance of the acoustic transmit transducer based on the monitored voltage level and the monitored current level to determine whether a defect is present.

2. The acoustic projector of claim 1 wherein the controller is configured to report the source level signal monitored to a remote controller configured to control the drive signal based on the source level signal.

3. The acoustic projector of claim 1, wherein the controller is further configured to report the monitored voltage level.

4. The acoustic projector of claim 3 wherein the controller is further configured to report the monitored voltage level to a remote controller configured to control the drive signal based further on the monitored voltage level.

5. The acoustic projector of claim 1, wherein the controller is further configured to report the monitored current level.

6. The acoustic projector of claim 5 wherein the controller is configured to report the monitored current level to a remote controller configured to control the drive signal based further on the monitored current level.

7. The acoustic projector of claim 1 wherein the controller is configured to control the drive signal based further on the impedance indication.

8. The acoustic projector of claim 1 wherein the acoustic receive transducer comprises a hydrophone.

9. The acoustic projector of claim 8 wherein the hydrophone comprises a polymer film.

10. The acoustic projector of claim 9 wherein the polymer film comprises piezoelectric polyvinylidene Fluoride (PVDF).

11. The acoustic projector of claim 8 wherein the hydrophone comprises a piezoelectric ceramic.

12. The acoustic projector of claim 1 wherein the acoustic transmit transducer and the acoustic receive transducer are attached to a common circuit board.

13. A method comprising:
producing a sound pressure radiation at a marine acoustic transmit transducer in response to a drive signal received from a transmit source;
producing a source level signal at a marine acoustic receive transducer in response to receiving at least a portion of the high-frequency sound pressure radiation;
monitoring the source level signal and controlling the driver signal, based on the source level signal, to control an acoustic power of the sound pressure radiation;
monitoring a voltage level of the driver signal and a current level of the driver signal; and
deriving an indication of impedance of the acoustic transmit transducer based on the monitored voltage level and the monitored current level to determine whether a defect is present.

14. The method of claim 13, wherein producing the source level signal at the acoustic receiver transducer includes producing the source level signal on a common circuit board to which the acoustic transmit transducer and the acoustic receive transducer are attached.

15. The acoustic projector of claim 1, wherein the sound pressure radiation is in a frequency range between about 7 kHz and about 10 kHz.

16. The acoustic projector of claim 1, wherein the sound pressure radiation is in a frequency range for repelling a marine mammal.

17. The method of claim 13, wherein the sound pressure radiation is in a frequency range between about 7 kHz and about 10 kHz.

18. The method of claim 13, wherein the sound pressure radiation is in a frequency range for repelling a marine mammal.

19. The acoustic projector of claim 1, wherein the sound pressure radiation is in a kHz frequency band.

20. The method of claim 13 wherein producing the source level signal at the acoustic receiver transducer includes producing the source level signal within a waterproof housing configured to contain the acoustic transmit transducer and the acoustic receiver transducer.

21. The method of claim 13 wherein controlling the driver signal, based on the source level signal, to control the acoustic power of the sound pressure radiation includes reporting the source level signal to a remote controller over a bus.

22. The method of claim 13 further comprising reporting the monitored voltage level.

23. The method of claim 22 wherein reporting the monitored voltage level includes reporting the monitored voltage level to a remote controller over a bus and further comprising controlling the drive signal based further on the monitored voltage level.

24. The method of claim 13 further comprising reporting the monitored current level.

25. The method of claim 24 wherein reporting the monitored current level includes reporting the monitored current level to a remote controller over a bus and further comprising controlling the drive signal based further on the monitored current level.

26. The method of claim 1 further comprising reporting the indication of impedance to a remote controller over a bus and further comprising controlling the drive signal based further on the impedance indication.

27. The acoustic projector of claim 1 wherein the acoustic transmit transducer and the acoustic receive transducer are within a waterproof housing.

28. The method of claim 13, wherein the sound pressure radiation is in a kHz frequency band.

* * * * *

UNITED STATES PATENT AND TRADEMARK OFFICE
CERTIFICATE OF CORRECTION

PATENT NO. : 9,775,336 B2
APPLICATION NO. : 14/099281
DATED : October 3, 2017
INVENTOR(S) : Frederic S. Boericke, II et al.

Page 1 of 1

It is certified that error appears in the above-identified patent and that said Letters Patent is hereby corrected as shown below:

In the Claims

In Column 8, Line 48, Claim 26: delete "claim 1" and replace with --claim 13--

Signed and Sealed this
Twenty-third Day of October, 2018

Andrei Iancu
*Director of the United States Patent and Trademark Office*